Nov. 5, 1963
R. S. BROWN
3,109,215
TUBING CLAMP
Filed Jan. 29, 1962
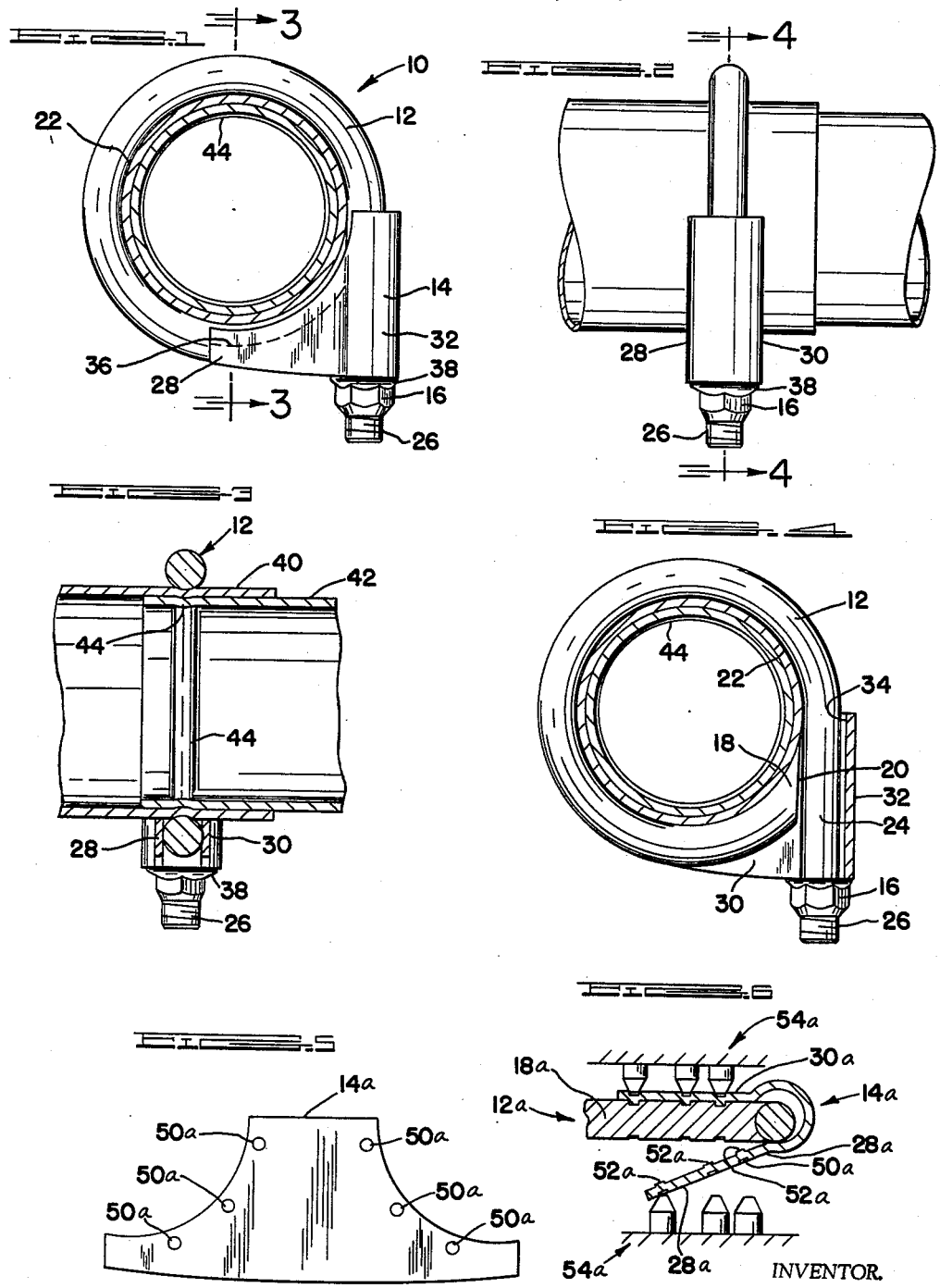
INVENTOR.
ROBERT S. BROWN
BY
OLSEN AND STEPHENSON
ATTORNEYS

United States Patent Office 3,109,215
Patented Nov. 5, 1963

3,109,215
TUBING CLAMP
Robert S. Brown, 2601 Sylvan Road, Rte. 2,
Chelsea, Mich.
Filed Jan. 29, 1962, Ser. No. 169,302
3 Claims. (Cl. 24—276)

The present invention relates to tubing clamps, and more particularly to improvements in tubing clamps which are employed for sealing together two sections of telescoped metal tubing, such as occurs at the juncture between the muffler and the end of the manifold pipe of an automobile.

It is an object of the present invention to provide a tubing clamp for telescoped sections of tubing or other tubular structures which will effect a seal the entire three hundred sixty degrees circumference of the telescoped portions.

It is another object of the present invention to provide a tubing clamp of the foregoing character which is constructed and arrange so that it can be manufactured by mass production with a minimum number of parts being employed.

It is still another object of the present invention to provide a tubing clamp which is constructed and arranged to provide an effective seal around the entire three hundred sixty degree circumference of telescoped parts, and wherein the tubing clamp comprises a single circular clamp adapted to encircle the entire circumference of the telescoped tubes, and wherein a single nut is employed for tensioning the circular clamp around the telescoped tubes.

Other objects of this invention will appear in the following description and appended claims, reference being had to the accompanying drawing forming a part of this specification wherein like reference characters designate corresponding parts in the several views.

In the drawing:

FIGURE 1 is a front elevational view of an embodiment of the present invention showing in section two telescoped tubes clamped together;

FIGURE 2 is an end elevation of the tubing clamp shown in FIGURE 1;

FIGURE 3 is a fragmentary section taken on the lines 3—3 of FIGURE 1;

FIGURE 4 is a transverse section taken on the lines 4—4 of FIGURE 2;

FIGURE 5 is a plan view of a sheet metal stamping adapted to be used in manufacturing another embodiment of the present invention; and FIGURE 6 is a schematic illustration, partly in section, illustrating a method of welding the clamping member of FIGURES 5 to the bolt portion of the present invention.

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Referring now to the drawing, the embodiment illustrated in FIGURES 1, 2, 3 and 4 will first be described in greater detail. The tubing clamp 10 includes the circular bolt or ring member 12, the sheet metal stamping or clamping member 14 and the nut 16.

The ring member 12 during its forming operation has its one end 18 cut so as to provide an end surface or face 20 which is a substantially tangential extension of the inner circumference of the circular portion 22. The other end 24 of the ring member 12 is a tangential extension of the circular portion 22 so that it is substantially parallel to and closely spaced from the end surface 20. Also, the terminus or terminal end of the end portion 24 is threaded, as at 26, for threadedly receiving the nut 16.

The clamping member 14 is formed from sheet metal and has opposite sides 28 and 30 which are adapted to fit against opposite sides of the ring member 12 and to be rigidly secured to the one end 18 of the ring member 12. The clamping member 14 also has a portion 32 which encircles the other end 24 of the ring member 12 and is in closely spaced relationship with said other end 24. Thus, end portion 32 in cooperation with the end face 20 defines an opening 34 which is tangential of the circular portion 22 of the ring member 12, through which opening the tangential other end 24 of the ring member 12 can extend.

The sides 28 and 30 of the clamping member 14 are secured rigidly to the one end 18 by suitable means, such as welded joints. Preferably, the welded joints will extend the full length of the dotted line indicated by the number 36 in FIGURE 1. Spot welding along this line may also be used, when desired.

It is preferred that the nut 16 be of a type having an enlarged shoulder portion 38 for bearing against the bottom edge of the clamping member 14 so that when the nut 16 is screwed onto the threaded end portion 26 the shoulder portion 38 will bear against the clamping member 14 thereby causing the ring member 12 to be placed in a state of tension, which will have the effect of depressing the outer metal tube 40 radially outwardly into the inner metal tube 42 as is shown best at 44 in FIGURE 3. As shown in FIGURES 1, 3 and 4, the ring member 12, when placed in tension, will provide, in effect, a three hundred sixty degree seal between the tube members 40 and 42, and this seal will be substantially continuous in a plane normal to the axis of the tubular members 40 and 42. Thus, a most effective seal is provided by a minimum number of parts comprising the tubing clamp. Furthermore, a tubing clamp is provided wherein substantially greater turning torque can be applied to the nut 16 without damage to the tubing clamp, than was possible with the tubing clamps previously used in this art. This is particularly significant because it enables the automobile industry to use heavier gauge metal in the tubing forming a part of the exhaust system of an automobile while being assured that an effective seal can be provided between telescoped tubular members.

Other suitable methods may be employed for securing the clamping member 14 to the ring member 12. If desired, a satisfactory metal stamping 14a may be employed which has depressions 50a formed therein as shown in FIGURES 5 and 6. By virtue of partially depressing the metal at 50a, metal projections 52a are formed on the inner surfaces of the opposite sides 28a and 30a. The one end 18a, FIGURE 6, may be formed with grooves or recesses therein for receiving the projections 52a. During the welding operation, a welding machine, fragmentarily shown at 54a in FIGURE 6, may be employed to press the opposite sides 28a and 30a together so that the projections 52a fit into the corresponding recesses in the one end 18a of the ring member and the welding operation can then be completed. Manufacturing the tubing clamp by this method assures a tubing clamp which can withstand maximum stress and strain on the welded joints between the clamping member 14a and the ring member 12a.

From the foregoing disclosure, it will be understood that a new and extremely simple tubing clamp has been provided which can be assembled on metal tubes with a minimum amount of effort and which will provide a more perfect seal between the telescoped metal tubes than was heretofore possible with the conventional prior art devices. Furthermore, the tubing clamp forming a part of the present invention can withstand greater torque loads applied to the fastening nut so that tubular members of greater thickness can be used in the exhaust system of motor vehicles.

Having thus described my invention I claim:

1. An external clamp for securing telescoped metal tubes together comprising a one piece ring member having an inner circular portion defining a circle and adapted to encircle and to be in engagement throughout its inner circumference with the outer circumference of the metal tubes to be clamped, one end of the ring member having an end face generally tangential of the inner circumference of the circular portion, the other end of said ring member extending tangentially from the circular portion adjacent to said end face and having a threaded terminal portion extending therebeyond, a clamping member having a pair of side portions rigidly secured radially outwardly of said circle to opposite sides of said one end of the ring member and an enclosing portion slidably encircling the other end of said ring member, said side portions having generally circular shaped upper edges of slightly greater radii than that of the inner circumference of said ring member and located so that only the ring member is adapted to engage telescoped metal tubes clamped by the external clamp, and a nut threadedly connected to said other end and bearing against said clamping member for tightening the external clamp, the parts being so constructed and arranged that contraction of said ring member upon tightening of said nut causes deformation of said tube by engagement of said inner circular portion only with the said outer circumference of the metal tubes.

2. An external clamp as claimed in claim 1 wherein said clamping member and said ring member are metallic members which are rigidly secured together by welded joints between said side portions and said opposite sides of said one end of the ring member.

3. An external clamp as claimed in clam 1 wherein said clamping member and said ring member are metallic members, said members being interlocked together by mating portions of said side portions and said opposite sides of said one end of the ring member and being welded together at the mating portions.

References Cited in the file of this patent

UNITED STATES PATENTS

| | | |
|---|---|---|
| 1,433,123 | Corey | Oct. 24, 1922 |
| 2,093,210 | Powell | Sept. 14, 1937 |
| 2,229,734 | Goodale | Jan. 28, 1941 |
| 2,533,952 | Pepper | Dec. 12, 1950 |
| 2,719,345 | Riker | Oct. 4, 1955 |
| 2,821,768 | Beckham et al. | Feb. 4, 1963 |